April 16, 1935.   C. L. BEAL   1,997,784
METHOD OF MAKING HOLLOW RUBBER ARTICLES
Filed Oct. 3, 1932
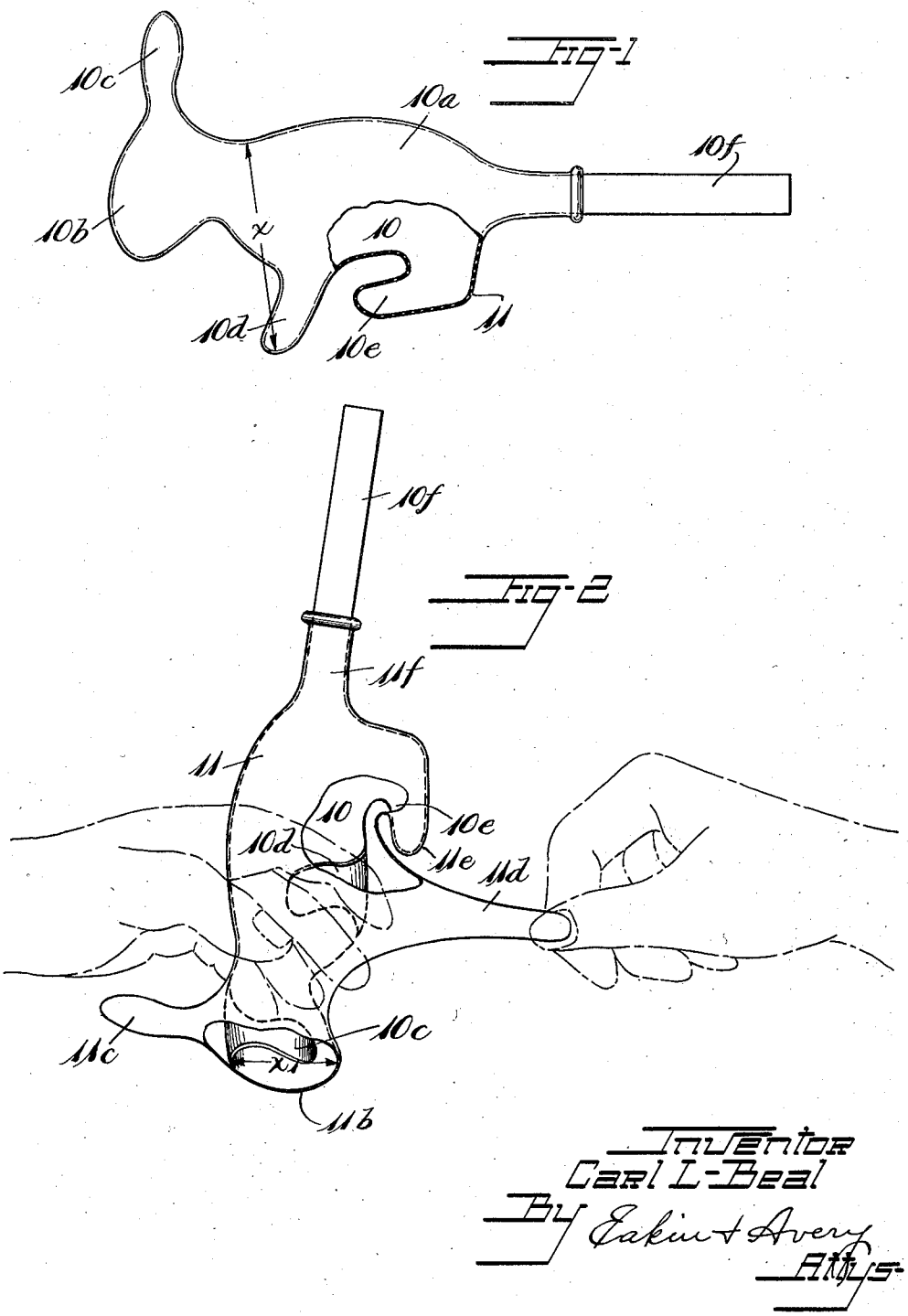
Inventor
Carl L. Beal
By Eakin & Avery
Attys Patented Apr. 16, 1935

1,997,784

UNITED STATES PATENT OFFICE 1,997,784

METHOD OF MAKING HOLLOW RUBBER ARTICLES

Carl L. Beal, Cuyahoga Falls, Ohio, assignor to American Anode, Inc., Akron, Ohio, a corporation of Delaware Application October 3, 1932, Serial No. 635,923

4 Claims. (Cl. 18—58)

This invention relates to the manufacture of hollow rubber articles of the type ordinarily made by dipping a forming base having the shape of the desired article into a rubber dispersion, withdrawing the base with an adherent coating of the dispersion or of rubber deposited therefrom, drying and vulcanizing the deposited coating, and stripping the article from the base.

The forming bases used in the above process heretofore have been made of metal, glass, porcelain, clay, bakelite, hard rubber, or like inflexible materials so that the bases have been essentially rigid and incapable of any material deformation. This fact has limited the allowable shapes which could be manufactured by the process because it has been necessary to design the articles and the forming bases therefor so as to allow stripping of the deposited rubber coating from the base. Consequently, it has been impossible to manufacture, in the manner described, articles having sections considerably larger or wider than the neck portion of the article, or the opening through which the forming base is ordinarily removed from the finished article. Efforts have been made to increase the allowable size of such enlarged sections by stretching the neck portion over the larger sections of the base during the stripping operation, but even this practice is restricted by the limited extensibility of the usually reenforced neck portion of the article and by mechanical difficulties in stripping the neck portion over long and irregular rigid form projections. Such practice also has frequently resulted in serious damage to the article suffered while being unduly stretched over projecting portions of the forming base in order to effect its removal therefrom.

The objects of the present invention are to provide inexpensive means for manufacturing by the process described articles having more intricate and elaborate shapes than have heretofore been made in that manner, and to provide means for removing such articles from the forming bases without damaging the articles.

Briefly, the invention comprises providing a forming base having such a shape that the effective width thereof is sufficiently greater than the width of the neck portion of the base which forms the opening in an article made thereon, through which opening the remainder of the base must pass during the stripping operation, that such stripping normally will be difficult or impossible; forming an article on such a base from a rubber dispersion, drying the article, and then deforming the base in such a manner as to decrease its effective width sufficiently to allow ready removal of the deformed base through the normally narrower or smaller neck opening of the article.

The term "effective width" refers to the width of the base at the widest part over which an article must be removed during the stripping of the article from the base, or the width of an opening necessary to allow passage of the base therethrough.

The desired end is accomplished by making the forming base of such a material that although the base will be sufficiently rigid to maintain its normal shape during the manufacturing operations, it will also be sufficiently flexible to permit of such deformation of its configuration as may be necessary to facilitate the removal of the base from the article.

The invention will be more fully explained with reference to accompanying drawing in which Fig. 1 is an elevation of a forming base embodying the principles of my invention, with a rubber deposit thereon, the rubber deposit being partially broken away; and Fig. 2 is a perspective view of the base and deposit of Fig. 1 in a partially deformed condition illustrating the manner in which the forming base is removed from an article made thereon.

The present invention is particularly useful in the manufacture of toy balloons of the more elaborate designs and types, and for convenience will be described in connection with the manufacture of such an article having a number of projecting portions which render the article incapable of manufacture by prior methods employing rigid forms for the reasons hereinabove indicated.

A substantially flat and relatively thin forming base 10 is prepared, for example in the shape of an animal such as a rabbit and comprising in this case a main body portion 10a, head 10b, ear 10c, feet 10d and 10e, and an inflating neck forming portion 10f which is extended to serve as a handle for the base, the several projecting portions of the base being so disposed and of such size as to impart to the form an effective width X sufficiently greater than the width of the neck-forming portion 10f to preclude the possibility of removing an article formed thereon, were the base rigid, without seriously injuring the article. The base may be made of any flexible material not rapidly injured by contact with liquids, particularly water and organic rubber solvents, and which when fabricated into a base as above described will possess sufficient rigidity to retain its shape when no force is applied thereto. It has been found that vulcanized rubber, preferably heavily compounded with fillers, is especially adapted for this purpose. The forming bases may be cut from sheets of the material being used or may be molded in the desired shape, or prepared in other manners commonly practiced in rubber manufacture.

The prepared forming base 10 is then coated with a rubber dispersion by spraying the dispersion on to the base, or by dipping the base into the dispersion, etc., after which the associated rubber coating 11 is dried, and if desired, vulcanized while on the base.

The base may be treated or coated, before application of the rubber dispersion, with any desirable treating substance such as materials capable of preventing adherence of the deposited rubber coating to the base, and likewise may be coated with a suitable rubber coagulant in the manner now commonly practiced so that a heavier rubber coating may be desposited thereon at one immersion in the rubber dispersion. Alternatively the coagulant may be applied to the coating of the dispersion after the latter is associated with the base, as by immersion thereof in a coagulant bath, or by spraying coagulant on to the surface of the freshly deposited dispersion. Obviously numerous other modifications may be made in similar details of the process.

When the deposited coating forming the article has been dried, and vulcanized if desired, it is then stripped from the base. Were the base rigid as in prior methods, this operation would obviously be impossible of execution without seriously injuring the article, because of the peculiar disposition and configuration of the several projecting portions of the base. However, in using a flexible deformable base as in the present invention, the above described difficulties are obviated, for as the article 11 is progressively stripped from the form, the several projecting portions of the body, and the body itself, may be bent inward, curved over, or otherwise deformed by a worker to decrease the effective width of the base to a new value $X_1$ sufficiently smaller than the normal effective width $X$ to facilitate removal of the rubber article from the base and to allow its ready passage through the neck opening 11f without unduly stretching that or any other portion of the article.

For example, the projections 11b, 11c, 11d and 11e of the rubber deposit may be pulled off the corresponding projecting portions of the base and these portions bent inward or over, being held in their deformed condition by the sides of the rubber deposit or by the operator's fingers as illustrated in Fig. 2. After its projecting portions have been so deformed, the base may be removed through the neck opening, such removal being facilitated if necessary by bending the body portion of the base into a curve to reduce further its effective width.

Once the article is removed from the base and the deforming force released, the rubber immediately regains its normal shape and may be used again to repeat the process.

The many advantages to be gained through the practice of this invention are evident from the foregoing explanation and are readily appreciated by one familiar with the manufacture of articles of the type mentioned.

While the invention has been described somewhat in detail in connection with the manufacture of toy balloons, it obviously is not limited to such use but is equally valuable in the manufacture of any hollow rubber article by the method herein described employing rubber dispersions, including natural and artificial aqueous dispersions of rubber or other similar natural or synthetic gums, as well as dispersions of rubber in organic solvents such as the so-called rubber cements, all of which may or may not contain fillers, vulcanizing agents, accelerators, age-resisters, coloring pigments, or other compounding ingredients commonly employed in rubber compositions.

I claim:

1. In the manufacture of a hollow rubber article having a section larger than an opening provided in the article, the method which comprises applying a coating of a rubber dispersion to a flexible, non-inflatable forming base having the shape of the article to be made, at least partially drying the rubber coating, then deforming the flexible base in such manner as to reduce the effective width thereof, and withdrawing the deformed base from the article formed by the rubber coating.

2. In the manufacture of a hollow rubber article having a section larger than an opening provided in the article, the method which comprises applying a coating of a rubber dispersion to a flexible non-inflatable rubber forming base having the shape of the article to be made, at least partially drying the rubber coating, then deforming the flexible base in such manner as to reduce the effective width thereof, and removing the deformed base from the article formed by the rubber coating.

3. In the manufacture of an inflatable rubber article having a section considerably larger than the neck opening provided for inflation purposes, the method which comprises applying a coating of a rubber dispersion to a flexible, non-inflatable rubber forming base having the shape of the article to be made, drying and vulcanizing the rubber coating, then deforming the flexible base sufficiently to allow withdrawal thereof through the neck opening in the article, and so withdrawing the base.

4. In the manufacture, by deposition of rubber from a rubber dispersion upon a forming base, of a hollow rubber article having a projection extending from the body of the article for a substantial distance which would prevent stripping of the article from a rigid forming base, the method which comprises applying a coating of a rubber dispersion to a flexible non-inflatable forming base having the shape of the article to be made, drying the rubber coating, stretching the projecting portion of the dried rubber coating off the corresponding portion of the flexible base, bending the projecting portion of the base over in such manner as to reduce the effective width of the base, and removing the deformed base from the article formed by the rubber coating.

CARL L. BEAL.